Figure 1:
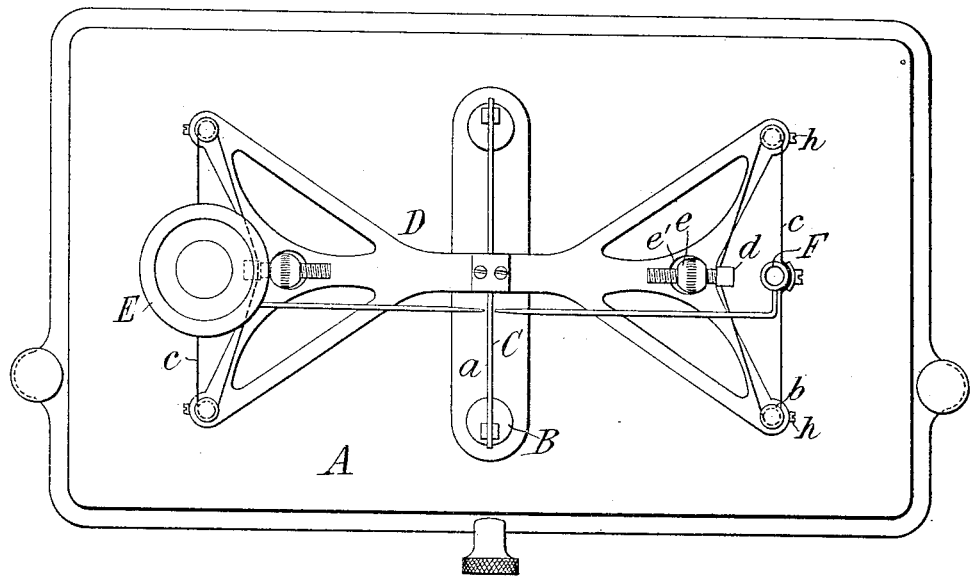

M. MUNZNER.
TORSION BALANCE SCALE.
APPLICATION FILED AUG. 12, 1912.

1,121,861.

Patented Dec. 22, 1914.
3 SHEETS—SHEET 1.

WITNESSES:
Fred White
René Buine

INVENTOR
Max Munzner,
By Attorneys,
Fraser Dirk & Myers

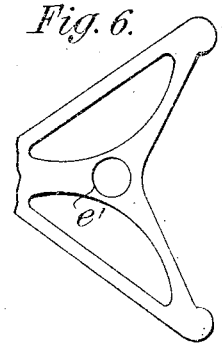
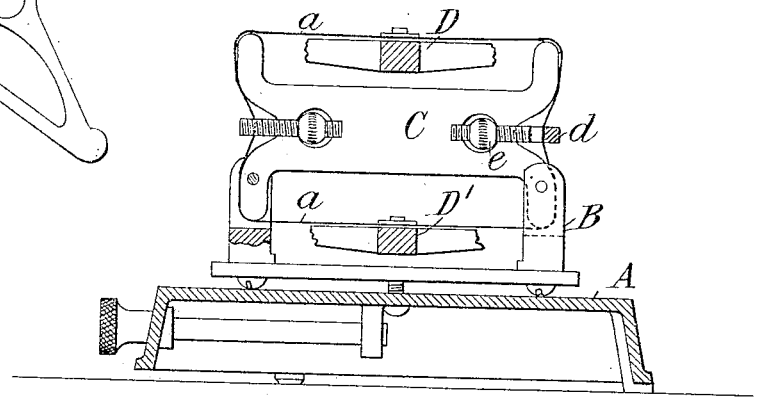
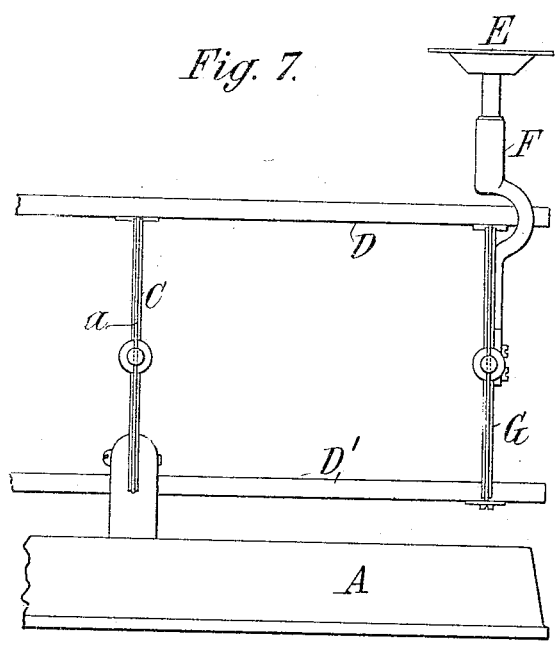
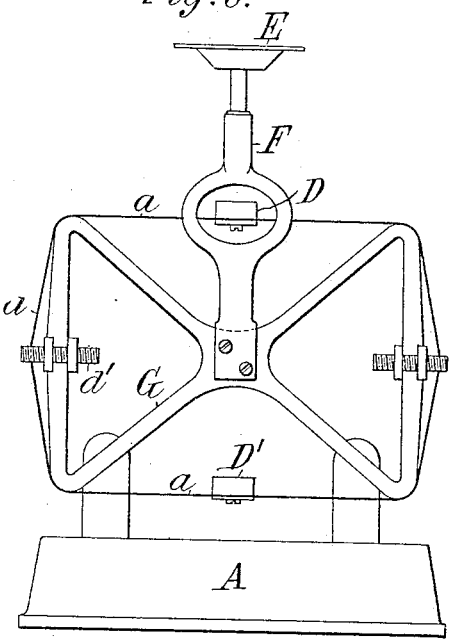
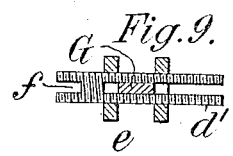

M. MUNZNER.
TORSION BALANCE SCALE.
APPLICATION FILED AUG. 12, 1912.

1,121,861.

Patented Dec. 22, 1914.
3 SHEETS—SHEET 3.

WITNESSES:
Fred White
René Pluine

INVENTOR:
Max Munzner,
By Attorneys,

UNITED STATES PATENT OFFICE.

MAX MUNZNER, OF ARLINGTON, NEW JERSEY, ASSIGNOR TO THE TORSION BALANCE COMPANY, OF NEW YORK, N. Y., A CORPORATION OF NEW YORK.

TORSION BALANCE-SCALE.

1,121,861.  Specification of Letters Patent.  Patented Dec. 22, 1914.

Application filed August 12, 1912. Serial No. 714,595.

*To all whom it may concern:*

Be it known that I, MAX MUNZNER, a citizen of the United States, residing at Arlington, in the county of Hudson and State of New Jersey, have invented certain new and useful Improvements in Torsion Balance-Scales, of which the following is a specification.

This invention relates to scales or balances of the torsion type, that is to say, those in which either the fulcrum or the scale pan (or equivalent) connections of the scale beam or balance beam are made by means of a stretched wire or ribbon which may twist slightly with the rocking movements of the beam, such wire serving in place of the usual knife edge bearings. It is necessary that such wire or ribbon (hereinafter called a wire) be stretched tightly, and this has commonly been done by carrying the wire around a truss frame of metal, joining its ends, and then stretching the wire to the desired tension by peening the metal of the frame whereby to enlarge such frame. In other cases the truss frame or other part on which the wire was stretched has been bent to receive the wire, and on elastically resuming its normal form it stretches the wire.

The present invention aims to improve upon these methods and render the tension wire readily adjustable at will, whereby to insure greater uniformity in the tension imparted to the wires than heretofore, and to facilitate varying such tension.

It also aims to facilitate the adjustment of the scale.

In some instances the wire is stretched upon a truss frame separate from the beam, and in other cases it is stretched upon a truss frame carried by or forming part of the beam itself. In either case the part carrying the wire is formed or provided with adjusting means for varying at will the tension of the wire, such means consisting preferably of a screw engaging the wire and the wire-carrying part, and arranged to push or draw the inactive portion of the wire more or less out of line and thereby to draw taut the active portion thereof and give it the desired tension.

In torsion balance scales it has been usual to mount the parallel balance beams upon upper and lower fulcrum wires of a fixedly mounted truss, and to connect their free ends respectively by engaging them to the upper and lower wires of movable trusses arranged in vertical planes, and these trusses have carried the posts on which the scale pans are mounted. The present invention provides a different and improved construction wherein the opposite ends of the two beams are the wire carrying parts, and the uprights carrying the scale pans are hung directly upon the wires carried by such beams.

Figure 2:
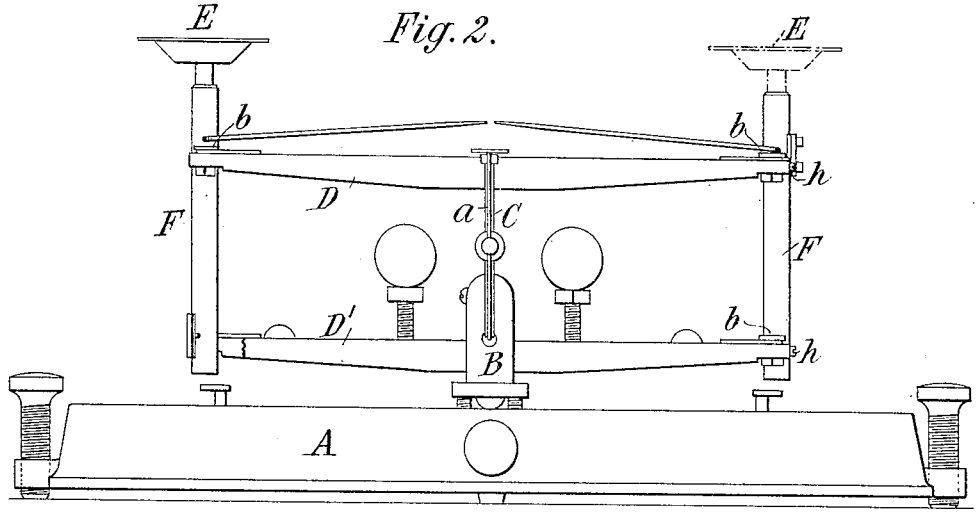
Figure 4:
Figure 5:
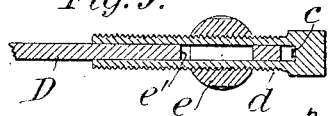
Figure 10:
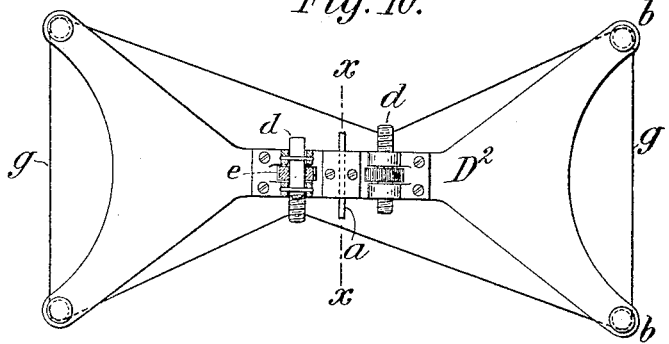
Figure 11:
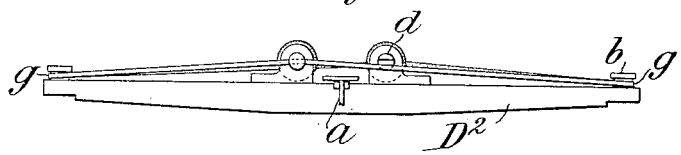
Figure 12:
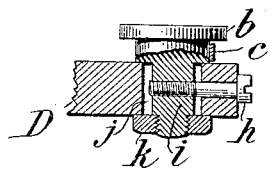

Referring to the drawings,—Figures 1 and 2 are respectively a plan and side elevation, the latter partly broken away in vertical section, of a torsion balance scale constructed according to my invention; Fig. 3 is a vertical transverse section thereof; Fig. 4 is a perspective view of an adjusting screw and nut; Fig. 5 is a fragmentary section of the screw and nut and the portion of beam engaged thereby; Fig. 6 is a fragmentary plan of this portion of the beam, the screw and nut having been removed; Fig. 7 is a partial side elevation, and Fig. 8 an end elevation of another construction; Fig. 9 is a fragmentary section showing the adjusting screw and nuts used in Fig. 8; Fig. 10 is a plan of a truss frame which constitutes a scale beam; Fig. 11 is a side view thereof; Fig. 12 is an enlarged fragmentary section showing means for adjusting the alinement of the active portion of the tension wires.

In the drawings A is the base, which may be of any usual or suitable construction, B is the fulcrum frame fixed thereon, C is the fulcrum truss, D D' are the upper and lower scale beams, E E are the scale pans, and F F are the upright supports for the latter. The beams D and D' are hung as usual upon the tension wires $a$ $a$ of the truss C.

In Figs. 1 and 2 the beams D D' are shown as widened or branched laterally at their ends, and provided with studs or projections $b$ $b$ around which are passed the tension wires $c$ $c$. The upright frames or posts F are fastened by clamping or otherwise to the middle portions of the stretched wires $c$ $c$. This construction takes the place of the usual upright trusses which in the ordinary construction carry the upright supports for the pans, such construction being generally of the character shown in Figs. 7 and 8.

For stretching the wires $c$ $c$ these are acted upon by adjustable screws $d$ $d$ moved by nuts *e e*. In the construction shown, each of the wires is engaged in its inactive part by one of the screws *d*, and the latter is propelled by turning a nut until it displaces the wire sufficiently out of line to stretch it to the desired tension.

In the construction shown in Figs. 4, 5 and 6 the screw is longitudinally slotted, leaving its head intact. The wire *c* is engaged by the end of this slot next the head; the screw is caused to straddle the thickness of the beam, as shown in Fig. 5, the nut *e* being first introduced into a socket *e'* in the beam (see Fig. 6) and being turned as the screw advances. By this means the screw is prevented from turning by the engagement of its slot with the beam, while the nut turns freely on the screw and by bearing against one side of the socket *e'* draws the screw against the tension of the wire until the latter is stretched to the desired tightness. The same adjustment may be applied to the tensional wires *a* of the fixed truss C, where the adjusting parts are of identical construction and marked with the same letters.

In Figs. 7 and 8 a different adjustment is shown wherein the adjusting screw instead of pulling the wire out of line acts to push it and thereby to stretch it. The screw *d'* is slotted as before and has a slot or notch *f* formed in its outer end to receive the wire. The long slot of the screw straddles the truss. The screw is adjusted endwise by turning nuts *e'* which are in the form of disks engaging the screwthreads and screwing against the opposite sides of the truss frame G. Fig. 8 shows how the wire *a'* is stretched by being forced out of line.

Preferably the adjusting means engages what I have called the inactive portion of the wire, as distinguished from the active portion, the latter being that which is stretched between the two points of support of the wire-carrying part or truss, and which between these points receives the other part, as to which the wire serves in lieu of a pivotal connection.

Figs. 10 and 11 show a construction wherein the truss around which an endless wire is stretched becomes the scale beam. The rigid truss or beam is lettered D². This is given a fulcrum pivot on the axis *x x* in any known way, preferably by mounting it upon the middle of a stretched wire *a*, which is carried by a fixed truss in the manner shown with reference to the truss C in Fig. 3. Around the frame or truss D² is carried a single endless wire *g* which as shown is stretched over four studs *b b* by the action of adjusting screws *d d*, which may be adjusted by a single nut, as shown in Fig. 9, or otherwise. The result of this adjustment is that the active portions of the wire *g g* which are stretched across the ends of the beam and extend parallel to the axis wire *a*, are stretched by the adjustment of either or both of the screws *d*.

It is important to be able to adjust accurately the active portions of the tension wires at opposite ends of the beam to bring such portions into exact parallelism with the pivotal axis of the beam, and in the case of an even balanced beam to bring the wires at opposite ends equally distant from such axis. For this adjustment my invention provides special adjusting means for initially locating the active portions of the wire by setting the studs *b b* toward or from the fulcrum axis. The studs *b b* are connected to the truss or beam with a slotted or lost motion connection, and a screw *h* is applied to each stud for determining its adjustment toward or from the pivotal axis. In Fig. 12, D is the body of the beam or truss, *b* is the stud, and *c* is the wire. The stud *b* has a neck or shank *i* which is capable of sliding in a slot *j* in the beam. The adjusting screw *h* passes through the outer end of the beam and enters a threaded socket in the neck *i*. The stud is held firmly in place by a lock-nut *k*. To make the adjustment, the nut *k* is slackened and the screw *h* turned in either direction to move the stud *b* out or in. Inasmuch as the wire is stretched in one direction the screw *h* need act only in the contrary direction.

In adjusting the scale the studs *b b* are located in approximately correct positions, the wire is applied, the adjusting screw for the wire is tightened only enough to give the wire its minimum tension, and thereupon after the parts of the scale are assembled, minute measurements are taken to determine whether the stretched active portions of the wire are in precise parallelism with the axis and are precisely equidistant therefrom, any deviation being corrected by proper adjustment of the screws *h h* until the stretched active portions of the wires are brought to precisely the correct adjustment. Such adjustment may in some instances involve a readjustment of the wire stretching screw. After the preliminary locational adjustment of the wires has been accomplished, the tensional adjustment is made to stretch them to the proper degree, which is accomplished as already described by proper adjustment of the wire tightening screw *d* or *d'*.

It is to be understood that the invention is not limited to a pan scale, either upright or suspended, nor to a scale having parallel balanced beams, either even-balanced or otherwise, nor to a scale the beams of which are mounted above a supporting base or platform, as these features may be replaced by any of the well known equivalents therefor, the substitution of which in this art is well understood.

The invention is applicable whatever may be the part which carries the wire, whether it be a stationary truss, a movable truss, a truss independent of the beam, a truss forming part of the beam, or a truss constituting the entire balance beam.

I claim as my invention:—

1. In a balance, an endless tension wire, a part carrying said wire, a part carried by said wire, and a screw adjustment engaging one of said parts and engaging the wire for deflecting it and thereby varying at will the tension on said wire.

2. In a balance, a tension wire, a part carrying said wire, a part carried by said wire, and adjusting means for varying at will the tension on said wire comprising a slotted threaded rod engaging the wire, and a nut screwing thereon and engaging said carrying part.

3. In a balance, a tension wire, a part carrying said wire, a part carried by said wire, and adjusting means for varying at will the tension on said wire comprising a slotted threaded rod engaging the wire and receiving said carrying part in its slot, and a nut screwing on said rod and engaging said carrying part.

4. In a balance, a truss, an endless tension wire stretched around said truss, and adjusting screws on opposite sides of said truss engaging the inactive portions of the wire, and deflecting such portions to vary the tension of the wire.

5. In a balance, a tension wire, a part carrying said wire having studs around which said wire is carried in a determined plane, and means for adjusting such studs in a direction in said plane perpendicular to the direction of the active portion of the wire whereby to change the alinement of the wire or displace it bodily.

6. In a balance, a tension wire, a part carrying said wire, studs carried by said part between which the wire is stretched, and means for adjusting either of said studs in a direction perpendicular to such stud and transverse to the direction of the stretched wire whereby to vary the location of the wire.

7. In a balance, a tension wire, a truss, studs carried by said truss between which the wire is stretched, and screws for adjusting said studs in a direction transverse to the direction of the stretched wire, whereby to adjust bodily the location of the wire.

8. In a balance, a tension wire, a truss, studs carried by said truss having a sliding engagement therewith and between which studs the wire is stretched, and adjusting screws for displacing said studs to bodily adjust the wire.

9. In a balance, a pivoted truss beam on a horizontal axis, studs carried thereby, a wire stretched horizontally between said studs in a direction approximately parallel with the pivotal axis, and means for adjusting said studs transversely to the direction of the stretched wire whereby to displace said wire toward or from such axis.

In witness whereof, I have hereunto signed my name in the presence of two subscribing witnesses.

MAX MUNZNER.

Witnesses:
C. G. MICCHALIS,
GEORGE M. CONWAY.

Copies of this patent may be obtained for five cents each, by addressing the "Commissioner of Patents, Washington, D. C."